No. 853,466. PATENTED MAY 14, 1907.
H. J. NAGLE.
PROTECTED CUSHIONED WHEEL.
APPLICATION FILED APR. 21, 1906.
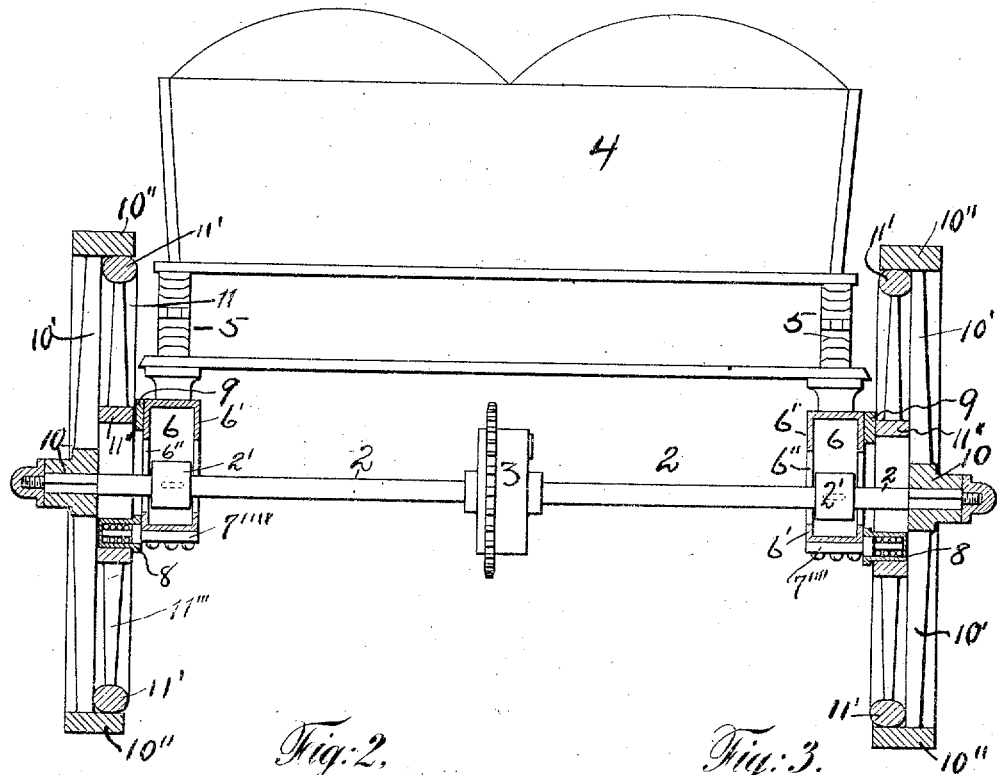
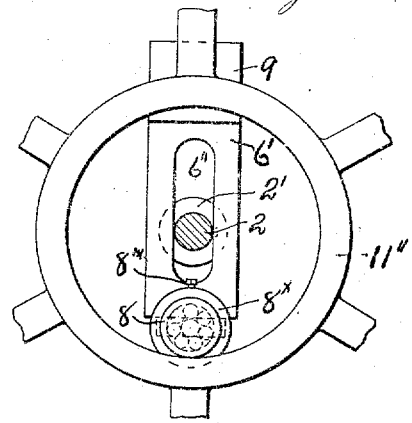
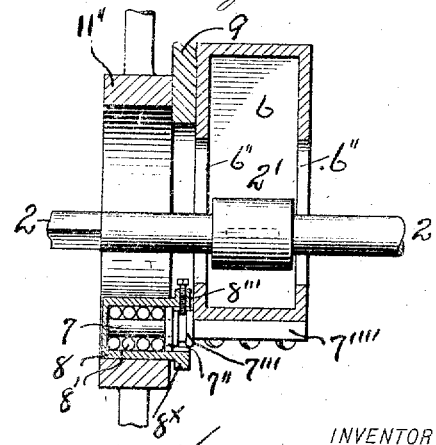
WITNESSES
Max B. A. Doring
J. A. Vernon
INVENTOR
Henry J. Nagle
BY
Henry A. Gough
ATTORNEYS

UNITED STATES PATENT OFFICE.

HENRY J. NAGLE, OF ABBOTTSTOWN, PENNSYLVANIA.

PROTECTED CUSHIONED WHEEL.

No. 853,466.　　　Specification of Letters Patent.　　　Patented May 14, 1907.

Application filed April 21, 1906. Serial No. 313,032.

*To all whom it may concern:*

Be it known that I, HENRY J. NAGLE, a citizen of the United States, residing at Abbottstown, in the county of Adams and State of Pennsylvania, have invented certain new and useful Improvements in Protected Cushioned Wheels, of which the following is a specification.

My invention relates to vehicle wheels, and more particularly to a wheel and shaft box therefor.

The object of my invention is to provide a vehicle wheel having an outer protective tire, and an independent cushion tire, thus maintaining the advantages of a cushion tire, while eliminating all danger of puncture.

To this end my invention consists in the arrangement of parts and details of construction set forth in the appended claims.

In the drawing, wherein like numerals designate like parts, Figure 1 is a rear view of a vehicle body, the rear wheels being in section. Fig. 2 is an interior face view of the axle box and hub of the cushioned wheel. Fig. 3 is a vertical section of the said box and hub.

While my invention may be applied to any form of wheeled vehicle, I have shown it as applied to the rear or driving axle of an automobile. 2 designates the said axle and 3 the driving gear and differential usually carried thereon.

4 indicates the vehicle body supported on the ordinary body-springs 5 5, which in turn bear on and are attached to the axle boxes. These are preferably vertically elongated or rectangular,—as shown in Fig. 2,—and form each an inclosing casing having outer and inner side plates 6'. These plates are vertically slotted as at 6" for the passage of the axle 2, the slot allowing said axle to rise and fall in said boxes. Fast on the axle and located within each box is a collar 2' of a diameter wider than the slot 6" and of a width about equal to the width of the box 6, to prevent the lateral movement of the axle, while allowing the axle freedom of vertical movement.

Projecting outward from the lower margin of box 6 is a small horizontal shaft 7 on which rotates an anti-friction bearing 8. Preferably I make this anti-friction bearing a ball bearing, and to that end I reduce the diameter of the shaft 7 and place between it and the bearing 8 the balls 8', said balls being held in place by the collar 7" which is slightly smaller than the interior diameter of the bearing 8. This bearing I prefer to make in the form of a thimble or cap inclosing the end of the shaft 7 and the balls rotating therein and projecting partly over the grooved collar 7''' with which it may have a rotatable engagement of any suitable kind. I have shown a screw pin 8''' as engaged with the grooved collar 7'''. This prevents the cap from being removed from the end of the shaft 7 without first removing the screw pin. It will be understood from this description that the thimble 8 forming the anti-friction bearing, has a rotation around the shaft 7 and is supported on the balls 8'.

While I may attach the shaft 7 to the box 6 in any desired manner, I have shown it as having a flat shank 7'''' projecting under the box 6 and bolted thereto, and to provide a surface against which the hub 11" of the wheel may bear, I provide the upper end of the box 6 with a face plate 9. This may be fastened to the box 6 in any desired manner and may extend down on either side of the slot 6".

To the end that I may provide a lower bearing surface for the said hub 11" of the independent wheel, I form the rotating thimble 8 with a flange 8× against the outer face of which said hub will bear, said outer face being in the same vertical plane as the outer face of plate 9. Upon the end of the axle is rigidly attached the hub 10 of an outer wheel which is adapted to turn with said axle 2, or, if the axle be a fixed one, it is adapted to rotate independently on the axle. As I have shown my invention as applied to automobiles, I have shown a driving axle and therefore the said outer wheel is fast thereon and turns therewith.

10" indicates the felly of a wheel provided with any suitable tire, and 10' designates the spokes which connect the hub 10 of the wheel with the said felly. The felly projects inwardly beyond the inner surface of the spokes 10' and within said felly and inside of the spokes of the outer wheel is the cushion-tired wheel 11. The tire 11' of this wheel may be of any suitable resilient material, as rubber or pneumatic tire. It has a hub 11" and spokes 11'''. It will be noted in the drawings that the interior diameter of the hub 11" is such that while the center of the wheel is co-incident with the axis of the axle 2, yet the inner face of the hub 11" will bear against the rotating thimble 8. The two wheels 10 and 11 are independent of each other, as far as movement in a vertical plane is concerned and as far as the resilience of the tire 11' will allow. The inner wheel, however, is held in position and against lateral movement by the spokes 10' of the outer wheel and by the plate 9 and the flange 8× of the thimble 8. This hub bears against the outer surface of the plate 9 and against the face of the flange 8×, as shown clearly in Fig. 3. As before stated any form of outer wheel 10 may be used and any form of protective tire thereon. The inner wheel also may have any form of elastic tire and may be constructed in any desired manner. It is for this reason that I have shown the simplest form of wheels in order that the principle of my invention may not be obscured by any unnecessary details.

It will be seen that in the operation of my invention any shock or jar will be received on the tire and fellies of the wheel 10, that said shock or jar will be transmitted more or less to the axle as is usually the case in vehicle constructions, but that the vertical movement of the axle due to such jar will not be communicated to the body of the vehicle except through the cushioned wheel 11. The jar will be very much deadened by the cushioned tire of this wheel and will then pass to the projecting shaft 7 and be transmitted slightly to the box 6. The jar upon the box 6, however, will be taken by the springs 5 which support the vehicle body. Any jar of the machinery, however, will not be transmitted to the vehicle body for the reason that the shaft 2 has vertical movement in the box 6 and is independent of the said box and any vibration of the shaft 2 must first be transmitted to the felly 10'', then to the cushioned tire 11' and then to the axle box 6 as before explained. While admitting of vertical movement of the wheels 10 and 11, the wheels are kept from any lateral vibration or strain by reason of the connection of the outer wheel to the axle 2 and of the combination of the two wheels being held in position against the bearing plate 9.

While I have shown the simplest form of my invention I wish it understood that I may modify it in many ways and elaborate its details without in the slightest departing from the principle thereof.

Having described my invention what I claim is:

1. In a vehicle, a wheel provided with a cushioned tire, in combination with a wheel having a protective tire extending over the tread surface of the cushioned tire, said last named wheel being movable independent of the said cushion tired wheel, and means for driving said wheels together while allowing the protecting wheel to have movement independent of the cushion tired wheel in a vertical plane, substantially as described.

2. In a vehicle, an axle, a boxing through which said axle extends and in which it is free to move vertically, a projecting bearing shaft supported on said boxing, a cushioned wheel surrounding said axle and said bearing shaft and having an enlarged hub surrounding the shaft and axle and eccentric to the said shaft, the inner surface of said hub having rotative engagement with said shaft, a wheel mounted on the said axle independent of the cushioned wheel and having a protective tire extending over the tread surface of the cushioned wheel, substantially as described.

3. In a vehicle, an axle, a vertically slotted box through which the axle passes, a shaft projecting from the lower end of said box, a wheel having an enlarged hub, whose center is eccentric to said shaft surrounding both the axle and the shaft, but having rotative bearing engagement with the latter, a cushioned tire on said wheel, and a protective wheel on the said axle having a tire projecting over the tread surface of the said cushioned wheel, substantially as described.

4. In a vehicle, an axle, a vertically slotted box through which the axle passes and in which it is free to move vertically, a collar on the said axle inclosed within said box, an outer protective wheel on the end of said axle and having an inwardly projecting tire and an inner wheel independent of the said outer wheel located within the same, having a tire of resilient material inclosed within the protective tire, said inner wheel having an enlarged hub surrounding the axle at a distance therefrom, and an outwardly projecting shaft supporting the anti-friction bearing and engaging with the inner surface of said hub, substantially as described.

5. In a vehicle, an axle, slotted boxings through which the ends of the axle pass and in the slots of which it has vertical movement, springs on the said boxings supporting the vehicle body, an outwardly projecting bearing shaft on each box having an anti-friction bearing thereon, outer wheels on the extremities of the axle having inwardly projecting protective tires, inner wheels located within the tires of the outer wheels having resilient tires, said inner wheels inclosing the axle and the bearing shafts, the hubs of said wheels having rotative engagement with the anti-friction bearings on the said shafts, substantially as described.

In testimony whereof, I have signed my name to this specification in the presence of two subscribing witnesses, this eighteenth day of April 1906.

HENRY J. NAGLE.

Witnesses:
N. M. BERKHEIMER.
M. A. STAUFFER.